United States Patent [19]

Hase et al.

[11] Patent Number: 5,353,649
[45] Date of Patent: Oct. 11, 1994

[54] NON-CONTACT DETECTING TYPE TORQUE SENSOR

[75] Inventors: Hiroyuki Hase; Rihito Shoji, both of Kyoto; Masayuki Wakamiya, Osaka, all of Japan

[73] Assignee: Matsushita Electric Industrial Co. Ltd., Osaka, Japan

[21] Appl. No.: 201,153

[22] Filed: Feb. 24, 1994

Related U.S. Application Data

[63] Continuation of Ser. No. 845,978, Mar. 4, 1992, abandoned.

[30] Foreign Application Priority Data

Mar. 4, 1991 [JP] Japan ................... 3-37205

[51] Int. Cl.⁵ .................................. G01L 1/00
[52] U.S. Cl. ...................... 73/862.335; 73/862.333
[58] Field of Search ............... 73/862.333, 862.334, 73/862.335, 862.336, 841, 842, 847; 324/309

[56] References Cited

U.S. PATENT DOCUMENTS

| | | | |
|---|---|---|---|
| 4,711,134 | 12/1987 | Kita | 73/862.333 |
| 4,780,671 | 10/1988 | Hase et al. | 324/209 |
| 4,817,444 | 4/1989 | Yagi et al. | 73/862.335 |
| 4,885,944 | 12/1989 | Yagi et al. | 73/862.335 |
| 4,899,597 | 2/1990 | Yagi et al. | 73/862.335 |
| 4,962,672 | 10/1990 | Yagi et al. | 73/862.335 |

FOREIGN PATENT DOCUMENTS

| | | |
|---|---|---|
| 0285260 | 10/1988 | European Pat. Off. . |
| 59-77326 | 5/1984 | Japan . |
| 290338 | 12/1986 | Japan ............... 73/862.336 |
| 2154130 | 6/1990 | Japan . |
| 2176436 | 7/1990 | Japan . |

*Primary Examiner*—Richard E. Chilcot, Jr.
*Assistant Examiner*—R. Biegel
*Attorney, Agent, or Firm*—Lowe, Price, LeBlanc & Becker

[57] ABSTRACT

A non-contact detecting type torque sensor having an enlarged measurable torque range is disclosed, in which a tubular torque transmission member having a mounting portion formed on its inner peripheral surface is fixedly mounted on a shaft, a tubular joining member fitted over the torque transmission member is welded at its opposite ends, a surface magnetic layer having a magnetostrictive properties is formed on an outer peripheral surface of the joining member, and coils are disposed around the surface magnetic layer. With this construction, the magnetic permeability of the surface magnetic layer varies with a torque transmitted from the shaft. A change in magnetic permeability is detected in terms of a change in self-inductance of the coils. The welded ends of the joining member are disposed outside the mounting portion of the torque transmitting member in a longitudinal direction of the shaft, so that the measurable torque range of the torque sensor can be enlarged.

10 Claims, 8 Drawing Sheets

NON-CONTACT DETECTING TYPE TORQUE SENSOR

This application is a continuation of application Ser. No. 07/845,978 filed Mar. 4, 1992.

BACKGROUND OF THE INVENTION

1. Field of the Invention

The present invention relates to a torque sensor for detecting a torque transmitted to a rotating shaft without direct contact with the rotating shaft.

2. Description of the Prior Art

There has been an increasing demand for non-contact detection of a torque which is transmitted to a rotating shaft.

One example of conventional non-contact detecting type torque sensors is disclosed in Japanese Patent Laid-open Publication No. 59-77326. The disclosed torque sensor includes a magnetostrictive amorphous magnetic alloy film formed by bonding or plating on an outer peripheral surface of a shaft. The amorphous magnetic alloy film has two juxtaposed portions formed symmetrically in helical forms slanting at +45° and −45°, respectively, with respect to a longitudinal axis of the shaft. A pair of coils are wound around the respective helical portions of the amorphous magnetic alloy film, with a predetermined space between the coils and the amorphous magnetic alloy film, Thus, a magnetic circuit is formed by the coils and the amorphous magnetic alloy film.

With this arrangement, when a torque is transmitted to the shaft, the outer peripheral surface of the shaft is strained or otherwise deformed. In this instance, if the torque acting on the shaft is clockwise, one helical portion of the amorphous magnetic alloy film which is slanting at an angle of +45° increases in its magnetic permeability, while the magnetic permeability of the other helical portion slanting at an angle of −45° decreases. This relation in magnetic permeability is reversed when the torque acts on the shaft in the counterclockwise direction. The difference in self-inductance between the two coils is measured by a differential detector whereby the direction and magnitude of the torque can be detected.

Another known non-contact detection type torque sensor is disclosed in Japanese Patent No. 169326, which uses a shaft having magnetostrictive properties. The shaft has two helical grooves formed symmetrically in its outer peripheral surface. One of the helical grooves has a positive pitch relative to the longitudinal direction of the shaft, while the other helical groove has a negative pitch relative to the longitudinal direction of the shaft. Two coils are wound around the respective grooved shaft surface portions in concentric relation to the shaft. When a torque is transmitted to the shaft, the shaft undergoes magnetostriction. The magnetic permeability of the grooved shaft surface portions changes in opposite directions, thereby changing self-inductance values of the respective coils which are wound around the grooved shaft surface portions. The difference in self-inductance between the two coils is electrically detected for simultaneously determining the direction and magnitude of the torque in a non-contact manner.

In the first-mentioned known torque sensor, the magnetostrictive amorphous magnetic alloy film is formed directly onto the outer peripheral surface of the shaft. With this construction, when the shaft surface is greatly strained by a torque, magnetic characteristics of the torque sensor are saturated and hence the torque sensor becomes insensitive to the torque. In addition, the amorphous magnetic alloy is likely to peel off or crack and, hence, the durability of the torque sensor is relatively low. The foregoing drawbacks may be overcome by enlarging the diameter of the shaft in such a manner as to reduce the amount of strain of the shaft surface against the same torque. Such an attempt is, however, impracticable because the shaft is excessively heavy. A magnetic layer may be formed on the shaft surface by bonding, plating or sputtering. This attempt is not satisfactory due to the necessity of an apparatus which is large in size and difficult to operate.

The last-mentioned known torque sensor depends on magnetostriction of the shaft and hence must grantee a certain degree of durability of the shaft when used for detection of a large torque. In order to provide the necessary durability, the magnetostrictive shaft is strengthened either by hardening or by enlarging its diameter, thereby lowering stresses created on the shaft surface. The hardening is effective to increase the mechanical strength of the shaft but causes a problem of deterioration of magnetic properties of the shaft. This process is, therefore, unable to realize a high precision torque sensor. On the other hand, the enlargement of the shaft diameter results in an excessively heavy shaft which is not suitable for practical usage and is difficult to handle when the helical grooves are formed in the shaft.

In addition, both of the above-mentioned know torque sensors have a problem that an apparent torque is developed when the shaft is rigidly assembled with an apparatus to which the torque sensor is applied.

SUMMARY OF THE INVENTION

With the foregoing drawbacks of the prior art in view, it is an object of the present invention to provide a non-contact detecting type torque sensor which is compact in size and highly durable in construction, has a large measurable torque range, is easy to assemble, and can easily be mounted in an apparatus to which the sensor is applied.

According to the present invention, there is provided a torque sensor which comprises: a shaft for transmitting a torque exerted thereon; a tubular torque transmission member fixedly mounted on the shaft along at least a part of its entire length, so as to form an inner joint portion between the shaft and the torque transmission member, the inner joint portion extending in a longitudinal direction of the shaft; a tubular joining member fitted over the torque transmission member and having two longitudinally spaced portions firmly connected to the torque transmission member to form two outer joint portions between the torque transmission member and the joining member; the torque transmission member and the joining member jointly constituting a range enlarging element, the inner joint portion having opposite ends, at least one of the opposite ends of the inner joint portion being disposed between the two outer joint portions in the longitudinal direction of the shaft, at least a part of the tubular joining member being made of a magnetic alloy having magnetostrictive properties; and means for detecting a change in magnetic permeability of the magnetostrictive magnetic alloy to determine the torque.

With this construction, a torque is transmitted from the shaft to the torque transmission member via the inner joint portion, thence to the joining member via the outer joint portions. The torque thus transmitted strains the magnetostrictive magnetic alloy, thereby changing the magnetic permeability of the magnetostrictive magnetic alloy. A change in magnetic permeability is detected for determining the direction and magnitude of the torque. As viewed in the longitudinal direction of the shaft, at least one end of the inner joint portion is disposed between the outer joint portions. This arrangement provides a considerably larger reduction of strain created in the joining member under torque than that provided by enlargement of the shaft diameter. With this reduction of strain, the durability of the torque sensor is improved. In addition, the torque sensor is compact in size because the enlargement of the shaft diameter is not needed. Furthermore, the magnetostrictive magnetic alloy may be in the form of a film attached to an outer peripheral surface of the joining member. The joining member is then firmly fitted over the torque transmission member. This assembling process obviates the need for a large-sized manufacturing facility the magnetostrictive magnetic alloy film and is able to prevent development of apparent torque when the torque sensor is attached to an apparatus.

The above and other objects, features and advantages of the present invention will become more apparent from the following description when making reference to the detailed description and the accompanying sheets of drawings in which preferred structural embodiments incorporating the principles of the present invention are shown by way of illustrative example.

DETAILED DESCRIPTION OF THE INVENTION

The present invention will be described below in greater detail with reference to certain preferred embodiments illustrated in the accompanying drawings.

Figure 1:
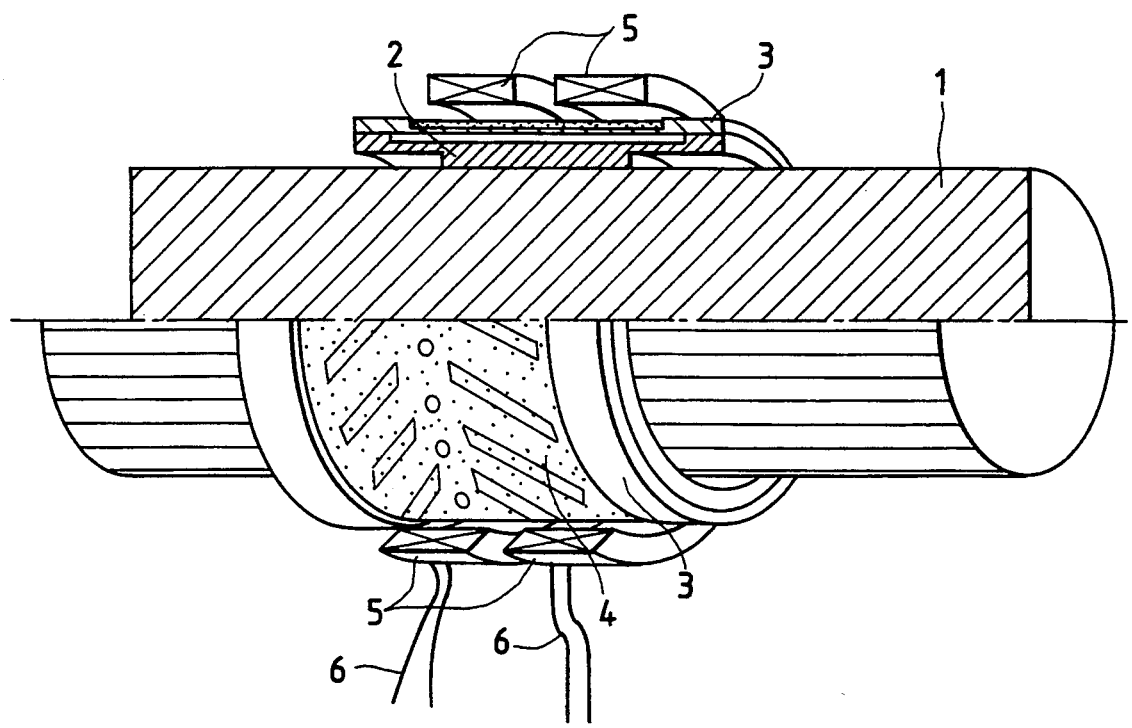
FIG. 1 is a perspective view, with parts cutaway for clarity, of a torque sensor according to a first embodiment of this invention.

FIG. 1 shows the general construction of a torque sensor according to a first embodiment of this invention. The torque sensor includes a shaft 1 of 30 mm in diameter, a tubular torque transmission member 2, and a tubular joining member 3, all the components 1, 2 and 3 being made of structural carbon steel $45C. The shaft 1 and the torque transmission member 2 are hardened to increase their mechanical strength. Numeral 4 is a tubular amorphous magnetic alloy film formed on an outer peripheral surface of the joining member 3. The amorphous magnetic alloy film 4 is made from a magnetostrictive material such as an Fe-Cr-Ni-Si-B alloy and has a saturation magnetostriction constant of $12 \times 10^{-6}$ and a thickness of 25 Nm. The torque sensor also includes two coils 5 disposed end-to-end and wound around the amorphous magnetic alloy film 4 with a space therebetween for detecting a change in magnetic properties of the amorphous magnetic alloy film 4. Each of the coils 5 has two coil ends 6.

Figure 2:
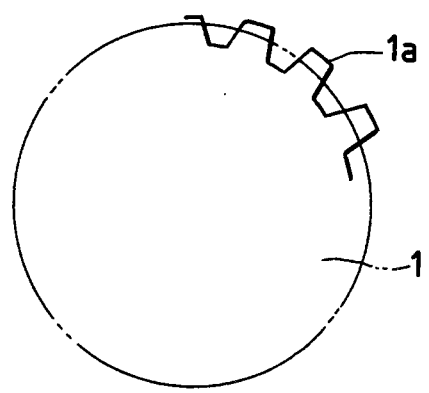
FIG. 2 is a fragmentary cross-sectional view of a shaft of the torque sensor.
Figure 3A:
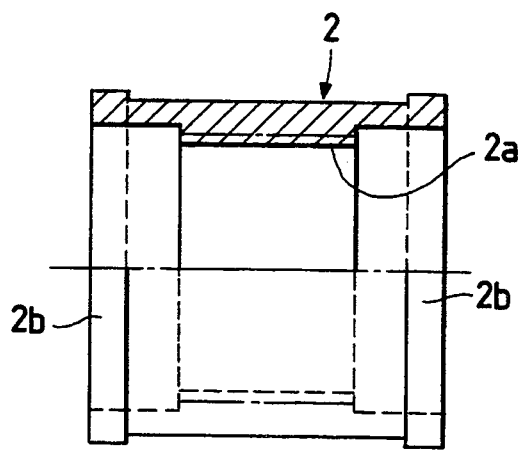
FIG. 3A is a front elevational view, partly in cross section, of a torque transmission member of the torque sensor.
Figure 3B:
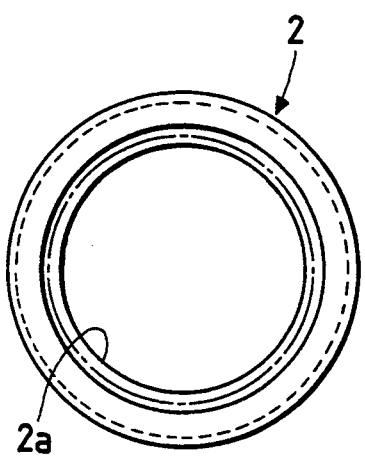
FIG. 3B is an end view of FIG. 3A.
Figure 4A:
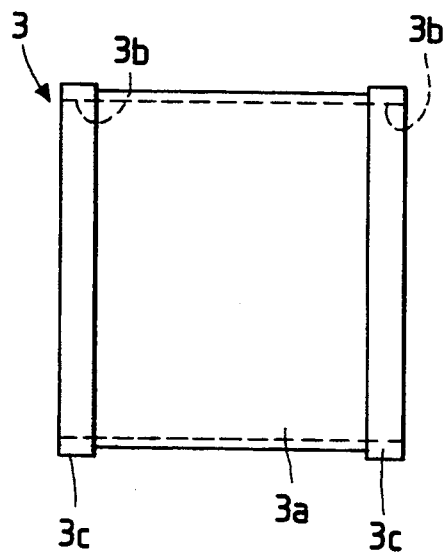
FIG. 4A is a diagrammatical front elevational view showing the general construction of a joining member of the torque sensor.
Figure 4B:
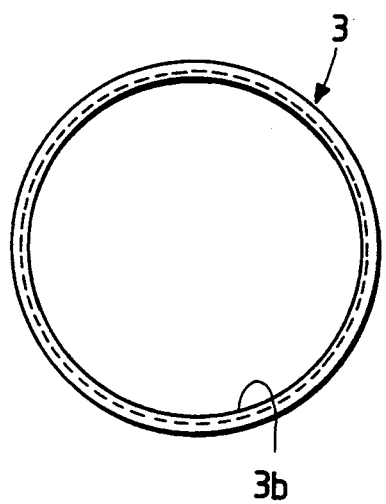
FIG. 4B is an end view of FIG. 4A.

As shown in FIG. 2, the shaft 1 is a splined shaft having a number of longitudinal gear-like ridges or splines 1a along its peripheral surface. Similarly, a central portion of the torque transmission member 2 has a number of splines 2a along its inner peripheral surface, as shown in FIGS. 3A and 3B. The splined central portion 2a of the inner peripheral surface constitutes a mounting portion. The torque transmission member 2 has on its outer peripheral surface a pair of outwardly projecting annular welding portions 2b located at opposite ends, respectively. As shown in FIG. 4A, the joining member 3 has a recessed annular bonding portion 3a formed in its outer peripheral surface for supporting thereon the amorphous magnetic alloy film 4. The joining member 3 also includes a pair of annular welding portions 3b extending along the inner peripheral surface thereof and located adjacent to opposite ends, respectively, of the joining member 3. The welding portions 3b of the joining member 3 and the welding portions 2b of the torque transmission member 2 are joined together by welding, thus forming two outer joint portions spaced in the longitudinal direction of the shaft 1. As a result of the formation of the recessed annular bonding portion 3a, the joining member 3 has a pair of radially outwardly projecting annular ridges 3c at opposite ends, respectively. The annular ridges 3c are used as positioning steps for positioning the amorphous magnetic alloy film 4 relative to the joining member 3 when the amorphous magnetic alloy film 4 is bonded to the joining member 3.

Figure 5:
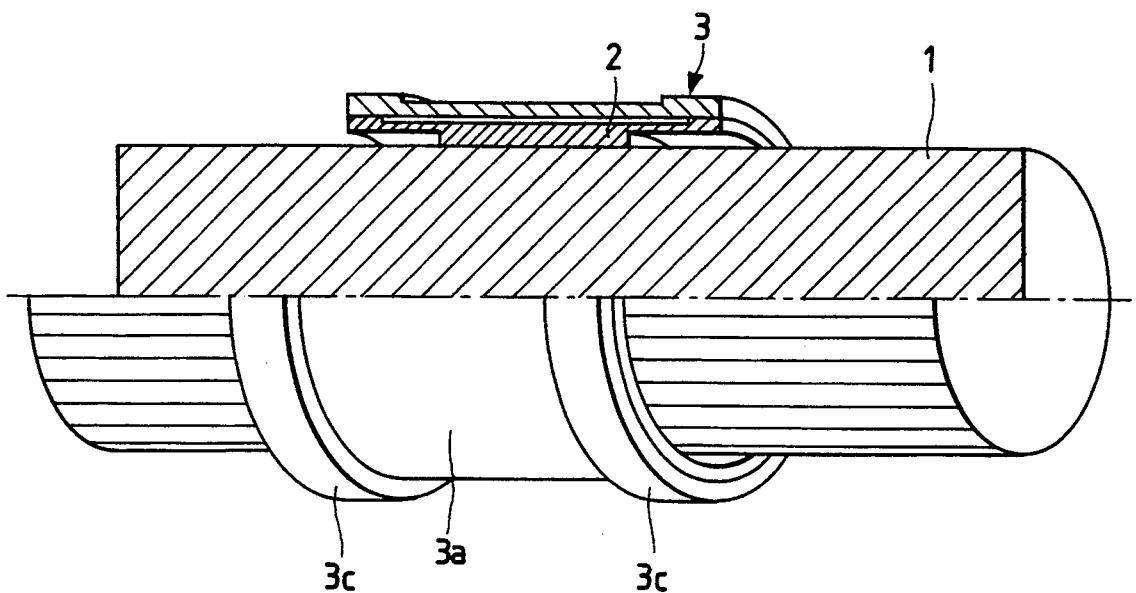
FIG. 5 is a partially cutaway view in perspective showing a manner in which a range enlarging element of the torque sensor is mounted.

The torque transmission member 2 and the joining member 3, as they are assembled together as shown in FIG. 5, jointly constitute a range enlarging element. In FIG. 5, the amorphous magnetic alloy film 4 is omitted for clarity.

The torque sensor of the foregoing construction is assembled as follows.

The shaft 1 and the torque transmission member 2 are firmly fitted together via a spline coupling between the splines 1a of the shaft 1 and the splines 2a of the torque transmission member 2. The splines 1a and 2a thus coupled jointly constitute an inner joint portion of the torque sensor.

Figure 6:
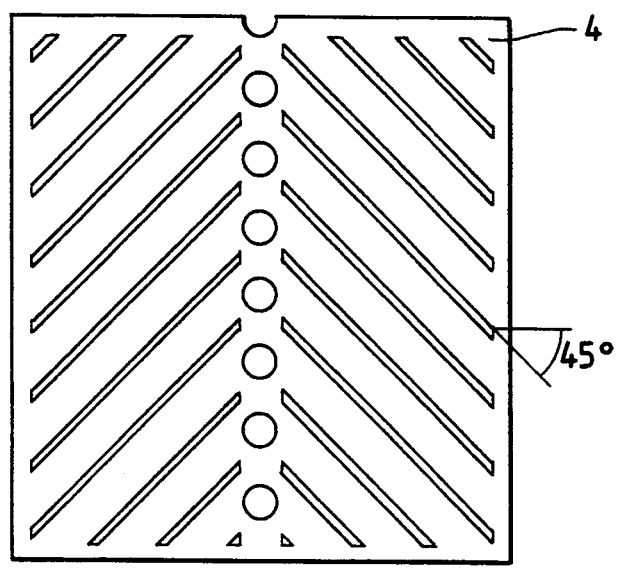
FIG. 6 is a plan view of an amorphous magnetic alloy film strip formed by etching.

Then, an amorphous magnetic alloy film 4, which has a positive magnetostrictive property and is formed by etching in the shape of a film strip as shown in FIG. 6, is firmly attached by bonding to the bonding portion 3a of the joining member 3. The amorphous magnetic alloy film 4 thus bonded forms a surface magnetic layer. The bonding is performed at 200° C. using a bismaleimide-triazine resin sold under the tradename BT2164 manufactured by Mitsubishi Gas Chemical Company. The joining member 3 with the amorphous magnetic alloy film 4 bonded thereto is then fitted over the torque transmission member 2 fixedly mounted on the shaft 1, and after that the welding portions 3b of the joining member 3 and the welding portions 2b of the torque transmission member 2 are joined together by spot-welding. The welding portions 3a and 3a thus spot-welded jointly form two longitudinally spaced outer joint portions.

The above-mentioned assembling process is able to prevent generation of an apparent torque which would otherwise Occur when the torque transmission member 2 is firmly attached to the shaft 1.

Figure 7:
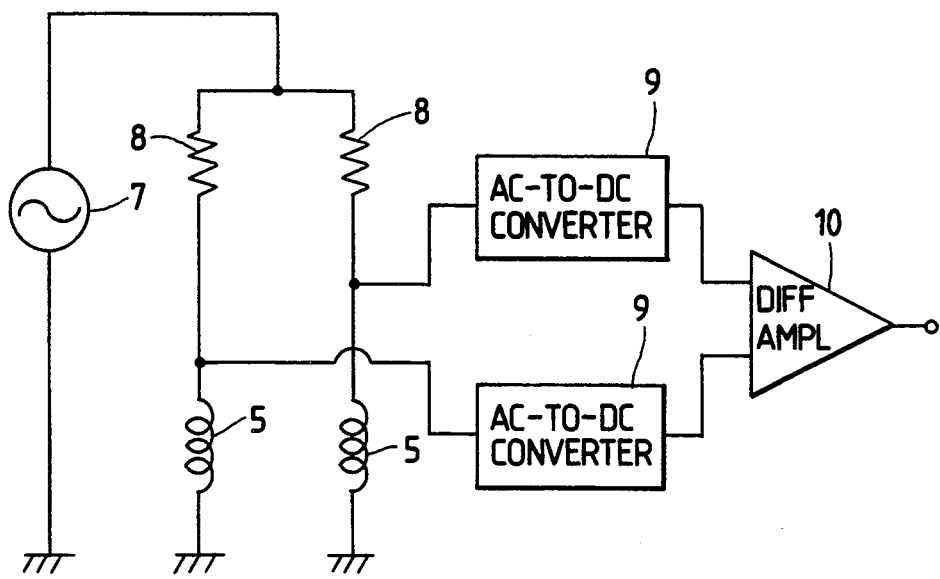
FIG. 7 is a circuit diagram showing a detecting circuit.

Thereafter, two coils 5 are disposed around the amorphous magnetic alloy film 4 in concentric relation to the shaft 1. Each of the coils 5 has two coil ends 6 (FIG. 1) which are connected to a detecting circuit shown in FIG. 7. The detecting circuit includes a sine-wave oscillator 7 operating at a frequency of 16 kHz, two resistances 8 and 8 each connected in series to one of the coils 5 so as to form a bridge circuit, two ac to dc converters 9 and 9 which hold the peak ac voltage appearing across each respective coil 5 and convert the ac voltage into dc voltage, and a differential amplifier 10 connected to the ac to dc converters 9, 9 for producing a torque sensor output which is proportional to the difference between the voltages applied to its two inputs from the respective converters 9, 9. The detecting circuit of the foregoing construction is used to evaluate characteristics of the torque sensor.

The torque sensor of the foregoing embodiment shown in FIG. 1 is so designed as to produce an output which is linear proportional to the developed torque up to 200 kgfm. Dimensions of the torque transmission member 2 and the joining member 3 are detailed as follows.

Figure 8:
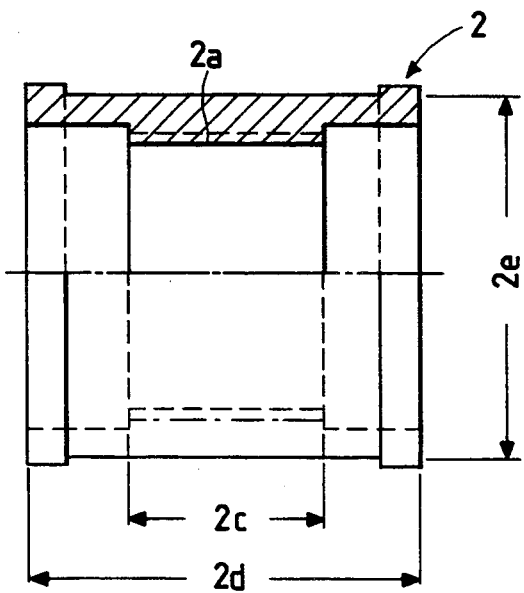
FIG. 8 is a front elevational, partly cross-sectional view explanatory of dimensions of the torque transmission member.

As shown in FIG. 8, the splines 2a formed in the inner peripheral surface of the torque transmission member 2 has a length 2c of 20 mm. The length 2d of the torque transmission member 2 is 40 mm. The diameter 2e is 40 mm and substantially equal to the outside diameter of the torque transmission member 2.

Figure 9:
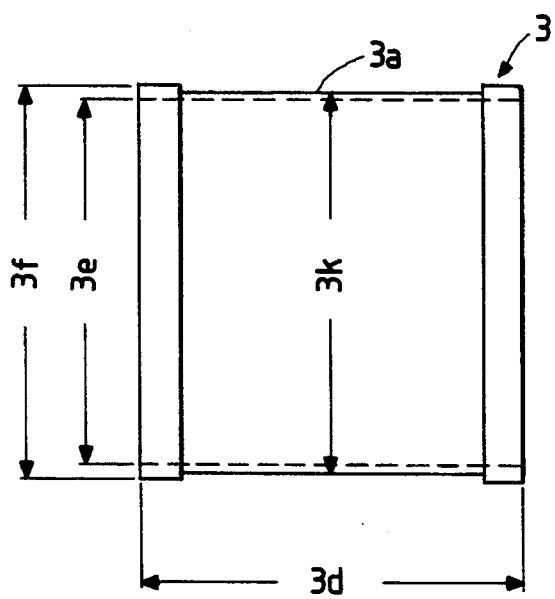
FIG. 9 is a front elevational view explanatory of dimensions of the joining member.

The joining member 3, as shown in FIG. 9, has a length 3d of 40 mm which is equal to the length 2d of the torque transmission member 2, an inside diameter 3e of 40 mm, and an outside diameter 3f of 41 mm. The bonding portion 3a of the joining member 3 has an outside diameter of 40.8 mm.

Figure 10:
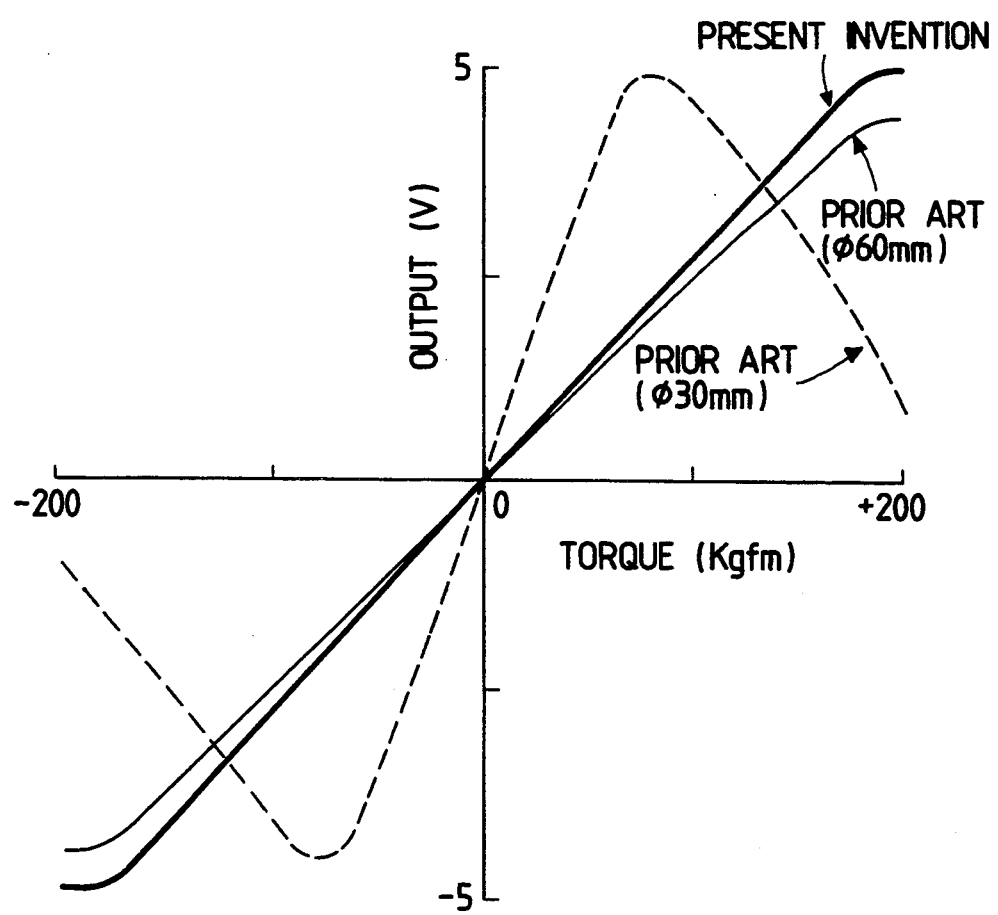
FIG. 10 is a graph showing the output characteristics of the torque sensor and two conventional torque sensors.

FIG. 10 is a graph showing the output of the torque sensor of this invention relative to the applied torque which ranges from −200 to +200 kgfm inclusive. For a comparative purpose, the output-applied torque characteristic curves of two conventional torque sensors are also shown in FIG. 10. The axis of abscissas of the graph represents the applied torque (kgfm), and the axis of ordinates represents the output of each torque sensor measured by the detecting circuit shown in FIG. 7. In FIG. 10, the thick solid line is the output-applied torque characteristic curve of the torque sensor of this invention, the thin solid line is the output-applied torque characteristic curve of one conventional torque sensor having a shaft diameter of 60 mm, and the broken line is the output-applied torque characteristic curve of the other conventional torque sensor having a shaft diameter of 30 mm. As is apparent from FIG. 10, the torque sensor of this invention exhibits an excellent linearity substantially throughout the range of the applied torque. The conventional torque sensor having a 30 mm shaft diameter generates a peak output when the applied torque is about +80 or −80 kgfm. Within a torque range exceeding +80 or −80 kgfm, the output of this conventional torque sensor decreases with an increase in torque. Regarding the conventional torque sensor having a 60 mm shaft diameter, the output is linear proportional to the applied torque until the applied torque is nearly equal to +200 or −200 kgfm.

After an endurance test made by repeatedly applying a 200 kgfm torque to the conventional, 30 mm shaft diameter torque sensor, the output characteristic of this torque sensor changed due provably to deterioration of the adhesive layer. As against the conventional torque sensor, the torque sensor of this invention withstood the endurance test without causing any change in its output characteristic even after 1,000,000 or more cycles of application of the 200 kgfm torque. The conventional, 60 mm shaft diameter torque sensor showed a durability comparable to the durability of the torque sensor of this invention.

When the shaft diameter is enlarged to the extent of 60 mm, surface strain (surface stress) created in the joining member 3 against the same torque is smaller than that of a small shaft diameter. Consequently, a torque sensor having such a large shaft diameter has a larger measurable torque range and a higher degree of durability than that of a torque sensor having such a small shaft diameter. However, when the large shaft-diameter torque sensor is applied to an automobile transmission, for example, it encounters various design and dimensional limitations. According to the torque sensor of this invention, the surface strain created in the amorphous magnetic alloy film 4 can be reduced merely by providing the torque transmission member and the joining member on a portion of the shaft, without relying upon enlargement of the shaft diameter in the form of a range enlarging element. With this reduction of surface strain, the measurable torque range and the torque sensor is considerably enlarged and, at the same time, the durability of the torque sensor is improved. As opposed to enlarging the shaft diameter up to 60 mm, the use of the range enlarging element is able to reduce the maximum shaft diameter to 42 mm.

The torque sensor described above has a measurable torque range between +200 and −200 kgfm. As appears clear from FIGS. 5 and 8, the outer joint portions are located on the outside of opposite ends of the inner joint portion as viewed in the longitudinal direction of the shaft 1. In this case, a stress created in the joining member 2 can be reduced in proportion to the ratio of the width 2d (FIG. 8) of the outer joint portions to the width 2c (FIG. 8) of the inner joint portion, and also in proportion to the diameter 2e of the torque transmission member 2. Owing to a combined effect of the joint width ratio 2d:2c and the diameter 2e, the measurable torque range can be enlarged. Since the stress created in the joining member 3 can be adjusted by the width ratio of the outer joint portions and the inner joint portion, it is possible to considerably enlarge the degree of design freedom of the torque sensor.

As described above, the torque sensor of the foregoing embodiment has a surface magnetic layer composed of the amorphous magnetic alloy film 4 bonded to the joining member 3. In the bonding process, only the joining member 3 is heated. This is particularly advantageous over the conventional torque sensor in which the amorphous magnetic alloy film 4 is bonded directly onto a surface of the shaft and hence the shaft must be heated. If the shaft of the conventional torque sensor is made of a hardened steel as in the case of the present invention, heating of the shaft during the bonding process will anneal the shaft, thereby lowering the mechanical strength of the shaft. This problem does not arise in the structure..of this invention because the amorphous magnetic alloy film 4 is bonded to the joining member 3 rather than the shaft 1.

According to the first embodiment described above, the amorphous magnetic alloy film 4 is bonded to the outer peripheral surface of the joining member 3 in such manner that two axially juxtaposed portions of the amorphous magnetic alloy film 4 are formed symmetrically in helical forms slanting at +45° and −45°, respectively. However, the advantageous effects of the invention described above are also effective in enlarging the measurable torque range and improving the durability of a surface magnetic layer against torque of a torque sensor of the type wherein a torque is detected in terms of a change in magnetic properties of the surface magnetic layer caused by magnetostriction of the surface magnetic layer when it is subjected to the torque. The composition, structure and method of fabrication (plating, spattering or vapor deposition) of the surface magnetic layer, the construction of a magnetic-property detecting means such as a head or coils, and the type of a magnetic alloy (crystalline magnetic alloy or amorphous magnetic alloy) used for forming the surface magnetic layer have nothing to do with the advantageous effects of the invention.

In the embodiment described above, the torque transmission member 2 and the shaft 1 are firmly connected via the spline coupling. The shaft 1 may be formed integrally with the torque transmission member 2. In this instance, the same advantageous effects as described above can be attained. The advantageous effects can be improved by increasing the thickness of the joining member 3.

Figure 11:
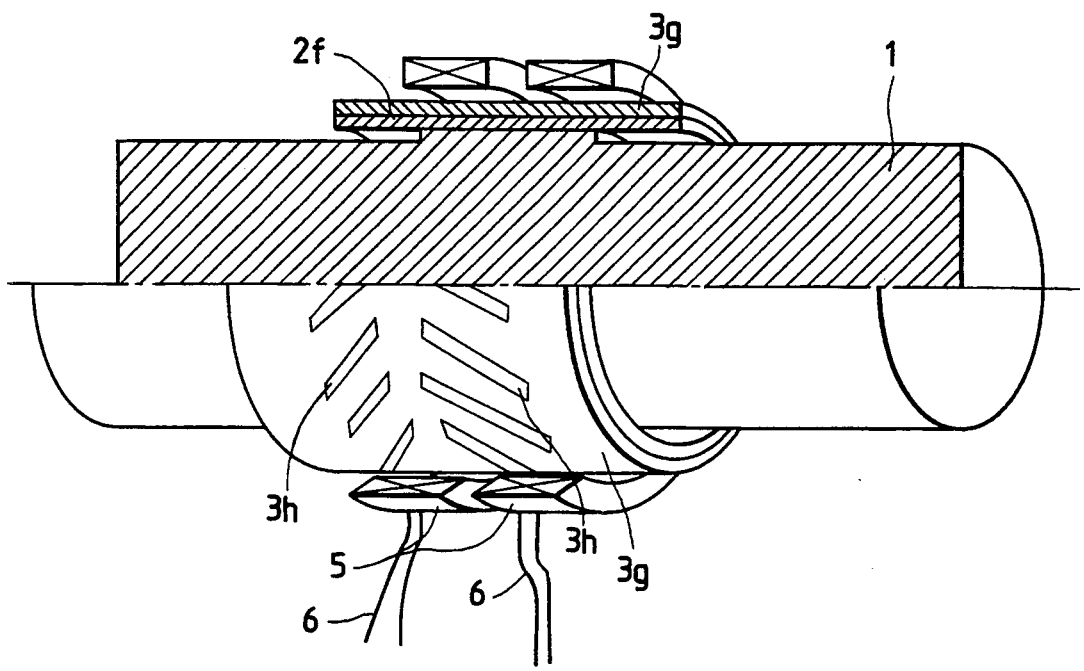
FIG. 11 is a perspective view, with parts cutaway for clarity, of a torque sensor according to a second embodiment of this invention.
Figure 12:
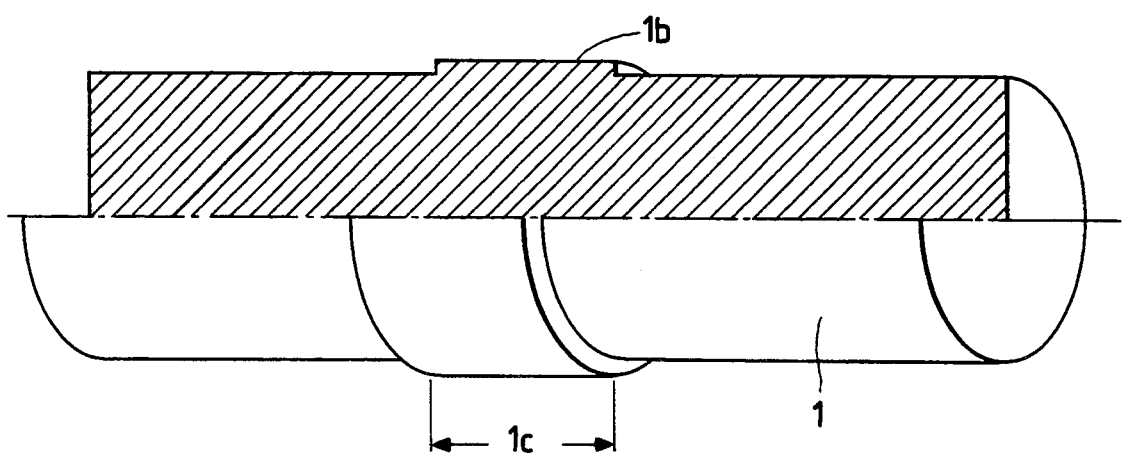
FIG. 12 is a perspective view, partly in cross section, of a shaft of the torque sensor shown in FIG. 11.
Figure 13A:
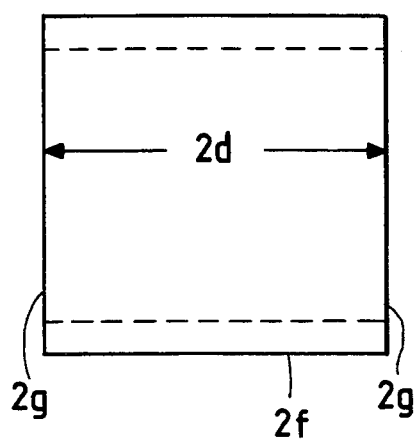
FIG. 13A is a front elevational view showing a torque transmission member of the torque sensor shown in FIG. 11.
Figure 13B:
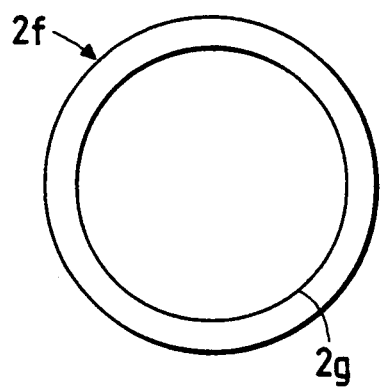
FIG. 13B is an end view of FIG. 13A.
Figure 14A:
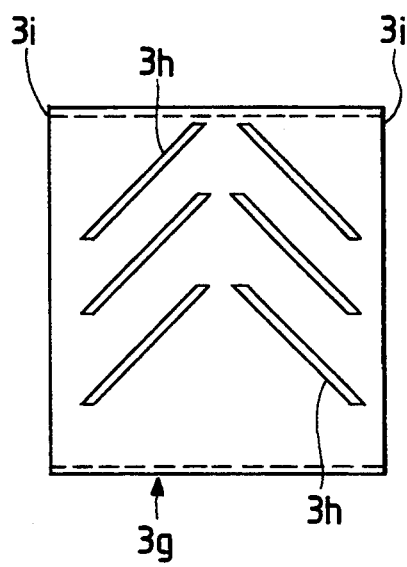
FIG. 14A is a front elevational view showing a joining member of the torque sensor shown in FIG. 11.
Figure 14B:
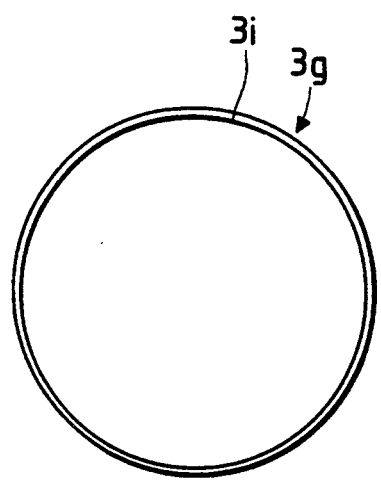
FIG. 14B is an end view of FIG. 14A.

FIG. 11 shows the general construction of a torque sensor according to a second embodiment of the present invention. These parts which are identical or corresponding to those of the first embodiment described above are designated by identical or corresponding reference characters. The torque sensor includes a shaft 1 made of titanium, a torque transmission member 2f, and a magnetostrictive joining member 3g made of 48% Ni-Fe steel. As shown in FIG. 12, the shaft 1 includes a large-diameter portion 1b extending along a length 1c of the shaft 1. The torque transmission member 2f is a hollow cylinder or tube having a length 2d (FIG. 13). The inside diameter of the tubular torque transmission member 2f is slightly smaller than the outside diameter of the large-diameter portion 1b of the shaft 1. The joining member 3g is a hollow cylinder or tube having a length which is the same as the length 2d of the torque transmission member 2f. The joining member 3g has, in its outer peripheral surface, two rows of grooves 3h slanting at angles of +45° and −45°, respectively, with respect to a longitudinal axis of the joining members 3g. The inside diameter of the joining member 3g is larger than the outside diameter of the torque transmission member 2f by about 0.1 mm, so that the joining member 3g can be smoothly fitted over the torque transmission member 2f.

A range enlarging element composed of the torque transmission member 2f and the joining member 3g is assembled as follows. At first, the torque transmission member 2f is firmly secured to the large-diameter portion 1b of the shaft 1 by shrinkage fitting. Then, the joining member 3g is fitted over the torque transmission member 2f, and after that welding portions 2g of the torque transmission member 2f and welding portions 3i of the joining member 3g are joined together by welding to form a range enlarging element. The range enlarging element has two outer joint portions at opposite ends thereof. In this assembling process, the joining member 3g is not influenced by various stresses which are created when the torque transmission member 2f is attached to the shaft 1. In the illustrated embodiment, the outer joint portions have a width (distance between the two outer joint portions) which is equal to the length 2d (FIG. 13) Of the torque transmission member 2f, while the inner joint portion have a width which is equal to the length 1c (FIG. 12) of the large-diameter portion 1b of the shaft 1. As viewed in the longitudinal direction of the shaft 1, opposite ends of the inner joint portion is disposed between the outer joint portions. With this arrangement, the measurable torque range increases in proportion to the ratio of the width of the outer joint portions to the width of the inner joint portion as well as the outside diameter of the torque transmission member 2f.

The range enlarging element of the foregoing construction is as compact as the range enlarging element of the first embodiment described above, can enlarge the measurable torque range, and has an excellent durability. In addition, the torque sensor according to the second embodiment does not use an adhesive and hence is highly resistant to moisture. Furthermore, the torque transmission member 2f is secured by shrinkage fitting to the shaft 1, so that the shaft 1 can manufactured easier than the splined shaft used in the first embodiment.

In the second embodiment described above, the joining member 3g of the range enlarging element is made of 48% Ni-Fe steel having magnetostrictive properties. However, this is not restrictive but illustrative. Eligible materials for the range enlarging element may include a magnetic alloy having magnetostrictive properties, such as Si-Fe steel.

Figure 15:
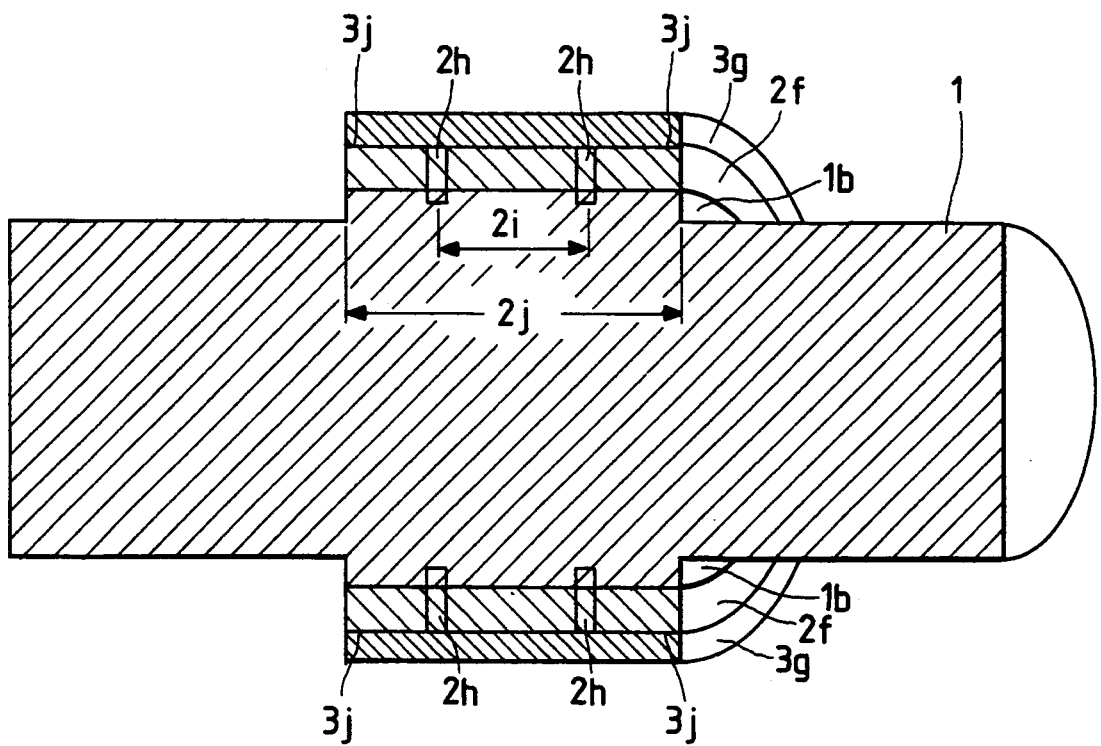
FIG. 15 is cross-sectional view in perspective showing the construction of a range enlarging element of a torque sensor according to a third embodiment of this invention.

FIG. 15 shows the general construction of a range enlarging element of a torque sensor according to a third embodiment of this invention. The range enlarging element includes a torque transmission member 2f and a joining member 3g which are identical to those of the second embodiment described above. A shaft 1 has a large-diameter portion 1b which is loose-fitted with the torque transmission member 2f. The torque transmission member 2f is joined by welding to the large-diameter portion 1b of the shaft at two longitudinal portions 2h, so that there is formed by and between the torque transmission member 2f and the shaft 1 an inner joint portion having a width 2i. From the point of view of mechanical strength, it is preferable that the welding is made continuously over the entire periphery of the torque transmission member 2f. However, the torque transmission member 2f and the large-diameter shaft portion 1b may be welded at a plurality of portions circumferentially spaced at intervals. The joining member 3g is made of a magnetostrictive material and loose-fitted over the torque transmission member 2f. The joining member 3g has, at its opposite ends, two welding portions 3j, 3j which are joined by welding to the torque transmission member 2f so as to form two outer joint portions spaced apart in the longitudinal direction of the shaft 1 by the distance 2j.

As shown in FIG. 15, opposite ends of the inner joint portion 2h are disposed within the with 2j of the outer joint portions. Since, stresses created in the joining member 3g decrease with an increase in the ratio of the width 2j of the outer joint portion to the width 2i of the inner joint portion, the measurable torque range of the torque sensor is enlarged. The degree of enlargement of the measurable torque range can be adjusted by changing the position of the welding portions 2h.

Figure 16:
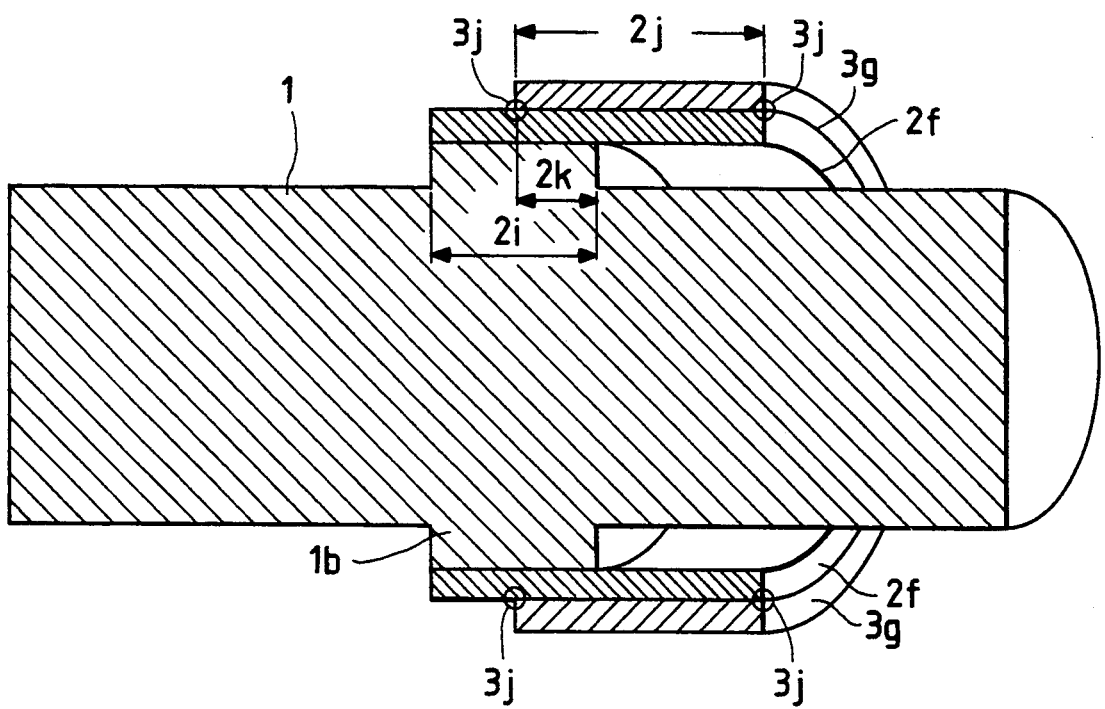
FIG. 16 is a view similar to FIG. 15, but showing the construction of a range enlarging element of a torque sensor according to a fourth embodiment of this invention.

FIG. 16 shows a range enlarging element of a torque sensor according to a fourth embodiment of this invention. In FIG. 16, these parts which are identical or corresponding to those of the third embodiment shown in FIG. 15 are designated by the identical or corresponding reference characters, and a further description thereof can be omitted.

The range enlarging element includes a tubular torque transmission member 2f shrink-fitted with a large-diameter portion 1b of a shaft 1 to form an inner joint portion having a width 2i. The torque transmission member 2f projects from a right hand end of the large-diameter portion 1b. A tubular joining member 3g of the range enlarging element is loose-fitted over the torque transmission member 2f and welded at its opposite ends 3j, 3j to the torque transmission member 2f to form two outer joint portions. The outer joint portions jointly have a width 2j. As viewed in the longitudinal direction of the shaft 1, only one of opposite ends of the inner joint portion is located within the width 2j of the outer joint portions. With this construction, stresses created in the joining member 3g by a torque decrease with an increase in the ratio of the width of the outer joint portion 2j to the width 2k of a part of the inner joint portion. Since, 2j is much larger than 2k, the torque sensor has an enlarged measurable torque range.

Obviously, various minor changes and modifications of the present invention are possible in the light of the above teaching. It is therefore to be understood that within the scope of the appended claims the invention may be practiced otherwise than as specifically described.

What is claimed is:

1. A torque sensor comprising:
   a shaft for transmitting a torque exerted thereon;
   a tubular torque transmission member mounted on said shaft along at least a part of its entire length, so as to form an inner joint portion between said shaft and said torque transmission member, said inner joint portion extending in a longitudinal direction of said shaft and having first and second longitudinal ends;
   a tubular joining member fitted over said torque transmission member and having two longitudinally spaced portions separated by a metal cylindrical member and firmly connected to said torque transmission member to form two outer joint portions between said torque transmission member and said tubular joining member;
   said torque transmission member and said joining member jointly constituting a range enlarging element, at least one of said first and second longitudinal ends of said inner joint portion being disposed between said two outer joint portions along the longitudinal direction of said shaft, at least a part of said tubular joining member including a magnetic alloy having magnetostrictive properties, said magnetic alloy formed on an outer peripheral surface of said metal cylindrical member, a surface of said magnetic alloy including a plurality of slits extending at a preselected angle to an axis of said metal cylindrical member and between said outer joint portions; and
   means for detecting a change in magnetic permeability of said magnetostrictive magnetic alloy to determine said torque.

2. A torque sensor according to claim 1, wherein said torque transmission member is formed integrally with said shaft.

3. A torque sensor according to claim 1, wherein said shaft is a splined shaft having a plurality of splines on its outer peripheral surface, said torque transmission member has a plurality of splines formed in its inner peripheral surface along a longitudinal portion of said torque transmission member, said splines of said shaft and said splines of said torque transmission member are firmly fitted together to form said inner joint portion, and said tubular joining member has a length equal to the length of said tubular torque transmission member and is welded at its opposite ends to said tubular torque transmission member to form said two outer joint portions.

4. A torque sensor according to claim 3, wherein both of said first and second longitudinal ends of said inner joint portion are disposed between said two outer joint portions in the longitudinal direction of said shaft.

5. A torque sensor according to claim 1, wherein said shaft has a large-diameter portion having a length shorter than the length of said torque transmission member, said torque transmission member is secured by shrinkage fitting to said large-diameter portion of said shaft, and said tubular joining member has a length equal to the length of said tubular torque transmission member and is welded at its opposite ends to said tubular torque transmission member to form said two outer joint portions.

6. A torque sensor according to claim 5, wherein both of said first and second longitudinal ends of said inner joint portion are disposed between said two outer joint portions in the longitudinal direction of said shaft.

7. A torque sensor according to claim 1, wherein said shaft has a large-diameter portion having a length equal to the length of said tubular torque transmission member, said torque transmission member has an inside diameter slightly larger than the diameter of said large-diameter portion of said shaft and is joined by welding to said large-diameter portion at two portions longitudinally spaced by a distance which is smaller than the length of said large-diameter portion, and said tubular joining member has a length equal to the length of said tubular torque transmission member and is welded at its opposite ends to said tubular torque transmission member to form said two outer joint portions.

8. A torque sensor according to claim 5, wherein said two longitudinally spaced portions of said torque transmission member are disposed between said two outer joint portions in the longitudinal direction of said shaft.

9. A torque sensor according to claim 1, wherein said shaft has a large-diameter portion having a length smaller than the length of said tubular torque transmission member, said torque transmission member is secured by shrinkage fitting to said large-diameter portion of said shaft, said tubular joining member has a length smaller than the length of said tubular torque transmission member and is welded at its opposite ends to said tubular torque transmission member to form said two outer joint portions, and one end of said large-diameter portion of said shaft is disposed between said two outer joint portions in the longitudinal direction of said shaft.

10. A torque sensor according to claim 1, wherein said tubular magnetic alloy is a tubular magnetostrictive magnetic alloy film bonded to an outer peripheral surface of said metal cylindrical member.

* * * * *